US009846786B2

(12) United States Patent
Martignoni

(10) Patent No.: US 9,846,786 B2
(45) Date of Patent: *Dec. 19, 2017

(54) METHODS, SYSTEMS, AND PRODUCTS FOR ANONYMOUS LOAN DOCUMENTS

(71) Applicant: ReverseVision, Inc., Raleigh, NC (US)

(72) Inventor: Thomas M. Martignoni, Raleigh, NC (US)

(73) Assignee: ReverseVision, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/791,451

(22) Filed: Jul. 5, 2015

(65) Prior Publication Data

US 2015/0310226 A1   Oct. 29, 2015

Related U.S. Application Data

(63) Continuation of application No. 13/227,534, filed on Sep. 8, 2011, now Pat. No. 9,098,882.

(60) Provisional application No. 61/381,602, filed on Sep. 10, 2010.

(51) Int. Cl.
| | |
|---|---|
| *G06F 21/62* | (2013.01) |
| *G06Q 50/18* | (2012.01) |
| *G06F 17/30* | (2006.01) |
| *G06Q 10/10* | (2012.01) |
| *G06Q 40/02* | (2012.01) |
| *H04L 9/32* | (2006.01) |
| *G06F 17/00* | (2006.01) |

(52) U.S. Cl.
CPC .... *G06F 21/6254* (2013.01); *G06F 17/30575* (2013.01); *G06Q 10/10* (2013.01); *G06Q 40/02* (2013.01); *G06Q 50/18* (2013.01); *G06F 17/00* (2013.01); *H04L 9/3213* (2013.01)

(58) Field of Classification Search
None
See application file for complete search history.

(56) References Cited

U.S. PATENT DOCUMENTS

| | | | |
|---|---|---|---|
| 2006/0178918 A1 | 8/2006 | Mikurak | |
| 2008/0046748 A1* | 2/2008 | Fujimoto | G06F 21/6254 713/182 |
| 2008/0320600 A1* | 12/2008 | Pandiscia | H04L 9/3231 726/27 |
| 2009/0025063 A1* | 1/2009 | Thomas | G06F 21/6218 726/4 |
| 2009/0150169 A1* | 6/2009 | Kirkwood | G06Q 10/00 705/342 |

* cited by examiner

*Primary Examiner* — Hosain Alam
*Assistant Examiner* — Tuan-Khanh Phan
(74) *Attorney, Agent, or Firm* — Scott P. Zimmerman, PLLC

(57) ABSTRACT

Methods, systems, and products create anonymous loan documents. Electronic loan documents are prepared for a borrower of a loan. An anonymous shadow copy of the electronic loan documents is generated that removes personally identifying information, such as names, addresses, and social security numbers. The anonymous shadow copy of the electronic loan documents may then be electronically published.

19 Claims, 6 Drawing Sheets

METHODS, SYSTEMS, AND PRODUCTS FOR ANONYMOUS LOAN DOCUMENTS

CROSS-REFERENCE TO RELATED APPLICATIONS

This application is a continuation of U.S. application Ser. No. 13/227,534 filed Sep. 8, 2011 and since issued as U.S. Pat. No. 9,098,882, which claims the benefit of U.S. Provisional Patent Application 61/381,602 filed Sep. 10, 2010, with both applications incorporated herein by reference in their entireties

COPYRIGHT NOTIFICATION

A portion of the disclosure of this patent document and its attachments contain material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

BACKGROUND

The exemplary embodiments generally relate to mortgages and, more particularly, to safeguarding personal information in mortgage applications.

A borrower applying for a reverse mortgage loan must get counseling from an independent counselor. This independent counselor is not permitted to have direct contact with a lender of the reverse mortgage loan. The counselor, though, should have access to loan documents prepared by the lender. A conventional solution is for the borrower to mail, electronically send, or physically present the loan documents to the counselor prior to or at counseling. This conventional solution, though, is cumbersome for the borrower. Another conventional solution is to publish the loan documents on a website, so the counselor may electronically access the loan documents via the Internet. Because the loan documents are borrower-specific and contain confidential information, a complicated authentication procedure is required.

DESCRIPTION OF THE DRAWINGS

These and other features, aspects, and advantages of the embodiments are better understood when the following Detailed Description is read with reference to the accompanying drawings, wherein.

DETAILED DESCRIPTION

Exemplary embodiments will now be described more fully hereinafter with reference to the accompanying drawings, in which exemplary embodiments are shown. The exemplary embodiments, however, may be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Those of ordinary skill in the art further understand that the exemplary hardware, software, processes, methods, and/or operating systems described herein are for illustrative purposes and, thus, are not intended to be limited to any particular named manufacturer.

Figure 1:
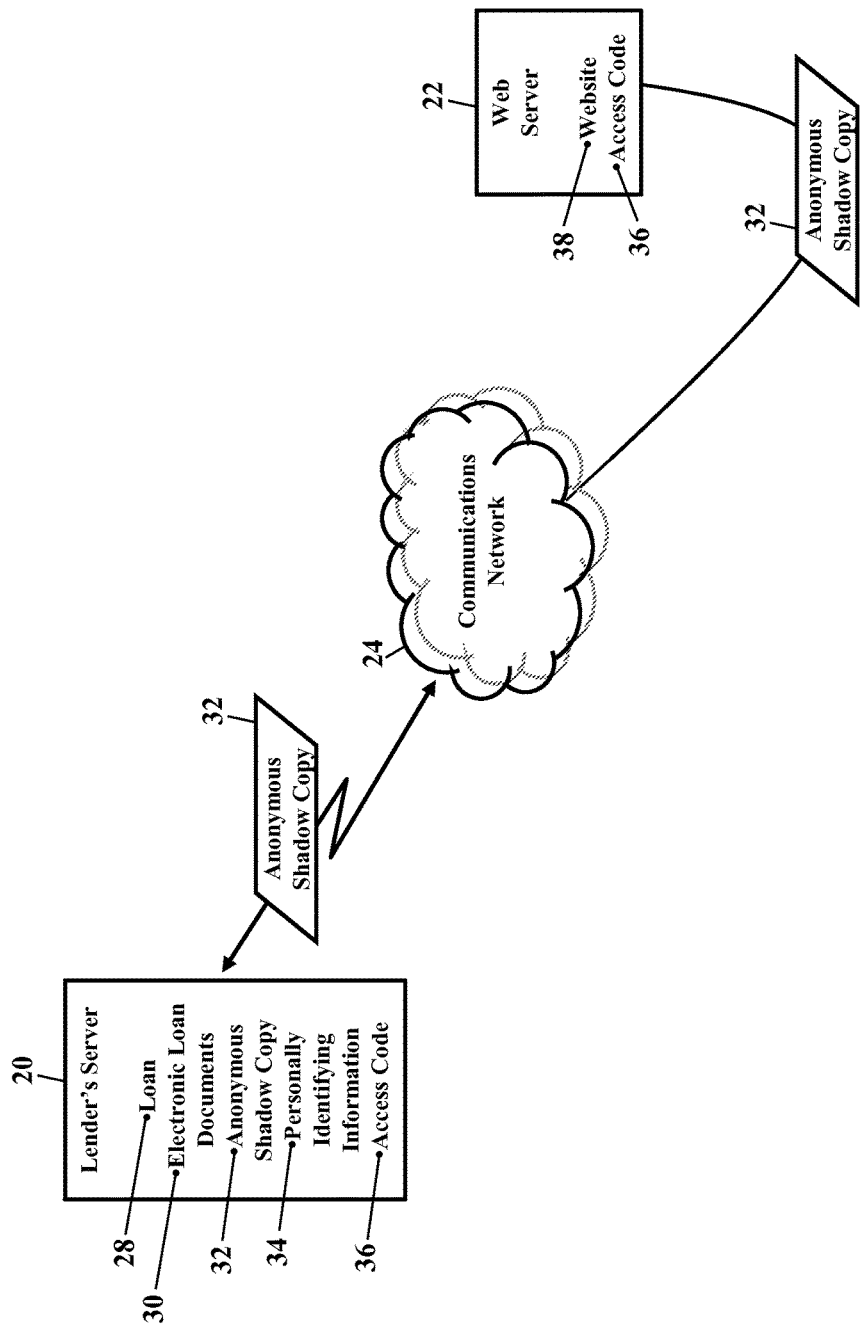
FIG. 1 is a simplified schematic illustrating an environment in which exemplary embodiments may be implemented.

FIG. 1 is a simplified schematic illustrating an environment in which exemplary embodiments may be implemented. FIG. 1 illustrates a client-server network architecture that provides anonymous loan documents. A lender's server 20 communicates with a web server 22 via a communications network 24. When a borrower applies for a loan 28, the lender's server 20 prepares electronic loan documents 30 associated with the borrower. The loan 28 may be any type of loan, such as secured or collateral-backed home mortgage, reverse mortgage, home equity loan, or car loan. Regardless of a type of the loan 28, the lender's server 20 may also generate an anonymous shadow copy 32 of the electronic loan documents 30. The anonymous shadow copy 32 may be an electronic copy of the loan documents 30 that were prepared for the borrower, but some or all personally identifying information 34 is eliminated from the anonymous shadow copy 32. The lender's server 20, for example, may remove names, addresses, and social security numbers from the anonymous shadow copy 32. Account numbers, credit card numbers, and any other personally identifying information 34 may also be redacted or rendered undecipherable (such as by blacking-out, striking through, or garbling). Because some or all of the personally identifying information 34 has been removed or rendered undecipherable, the anonymous shadow copy 32 has been rendered anonymous. Detailed financial information may remain, but any fields containing the personally identifying information 34 may be cleared of data.

The anonymous shadow copy 32 may then be electronically published. Once the anonymous shadow copy 32 is generated, the lender's server 20 may associate the anonymous shadow copy 32 to an access code 36. The access code 36 may be created prior to building the anonymous shadow copy 32. The access code 36 may even be part of, or integrated into, the anonymous shadow copy 32. The anonymous shadow copy 32 may then be uploaded to the web server 22 and/or published to a website 38. The anonymous shadow copy 32 may then be accessible to any person having the correct access code 36.

Exemplary embodiments greatly reduce security concerns. The anonymous shadow copy 32 may contain none of the personally identifying information 34. Even if a rogue user may guess the correct access code 36 and download the anonymous shadow copy 32, no personally identifying information 34 will be revealed. That is, any unauthorized or unintended access to the anonymous shadow copy 32 will not violate any regulation or reveal the personally identifying information 34. Even greater security measures may be taken, as later paragraphs will explain.

Exemplary embodiments may be applied regardless of networking environment. The communications network 24 may be a cable network operating in the radio-frequency domain and/or the Internet Protocol (IP) domain. The communications network 24, however, may also include a distributed computing network, such as the Internet (sometimes alternatively known as the "World Wide Web"), an intranet, a local-area network (LAN), and/or a wide-area network (WAN). The communications network 24 may include coaxial cables, copper wires, fiber optic lines, and/or hybrid-coaxial lines. The communications network 24 may even include wireless portions utilizing any portion of the electromagnetic spectrum and any signaling standard (such as the I.E.E.E. 802 family of standards, GSM/CDMA/TDMA or any cellular standard, and/or the ISM band). The communications network 24 may even include powerline portions, in which signals are communicated via electrical wiring. The concepts described herein may be applied to any wireless/wireline communications network, regardless of physical componentry, physical configuration, or communications standard(s).

Definitions

Unless otherwise specified the following definitions apply throughout this document:
Or is inclusive, meaning: "red or green" may be either red, green or red and green.

Figure 2:
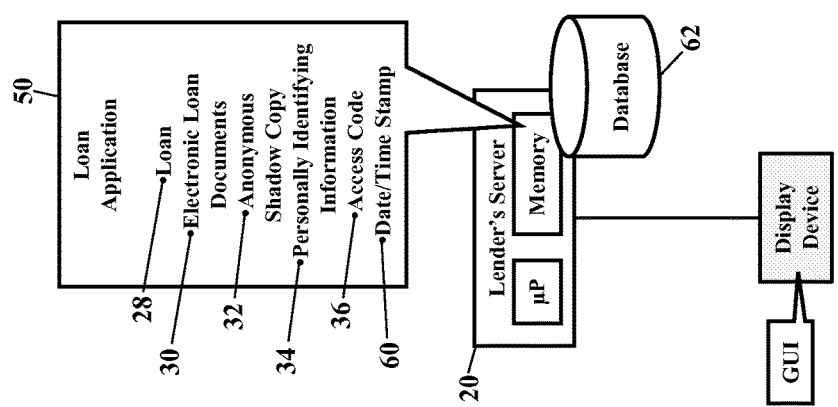
FIG. 2 is a more detailed schematic illustrating the lender's server, according to exemplary embodiments.

FIG. 2 is a more detailed schematic illustrating the lender's server 22, according to exemplary embodiments. Here the lender's server 22 has a processor (e.g., "µP"), application specific integrated circuit (ASIC), or other component that executes loan origination software 50 stored in memory. The loan origination software 50 may cause the processor to produce a graphical user interface ("GUI"). The graphical user interface is illustrated as being visually produced on a display device, yet the graphical user interface may also have audible features. The loan origination software 50, however, may operate in any processor-controlled device, as later paragraphs will explain.

The lender's server 22 generates the electronic loan documents 30 associated with the borrower. The lender's server 20 may also generate the anonymous shadow copy 32 of the electronic loan documents 30. Some or all of the personally identifying information 34 is eliminated from the anonymous shadow copy 32. The loan origination software 50 causes the processor to store the anonymous shadow copy 32 in the memory of the lender's server 20.

The lender's server 20 may also associate the anonymous shadow copy 32 to the access code 36. While the access code 36 may be robust and/or complicated, exemplary embodiments may utilize a simple access code. Because most borrowers want a simple and easily understood loan process, the access code 36 is preferably a unique alphanumeric combination that is easy to remember, easy to communicate, and easy to enter. The access code 36, then, is preferably only a few alphanumeric characters, even though such a simple access code 36 may be easily guessed by a rogue, unauthorized user. Regardless of the complexity of the access code 36, the access code 36 may be associated with date and time stamp 60. The access code 36 and the date and time stamp 60 may then be associated in a table in a database 62.

The loan origination software 50 may then match the anonymous shadow copy 32 to the access code 36. The loan origination software 50, for example, may store the anonymous shadow copy 32 directly in the same database row as the access code 36. The loan origination software 50 may alternatively store a pointer to the anonymous shadow copy 32. The loan origination software 50 may also associate some or all of the personally identifying information 34 to the access code 36. The loan origination software 50 may also associate or link the access code 36 to a unique identifier for the loan in the system or to a loan number. The database 62, for example, may link or associate the access code to a loan record containing the personally identifying information 34. The loan origination software 50 may additionally or alternatively store and retrieve borrower information (such as the borrower's initials in an additional field in the same row as the access code 36 in the relevant table of the database 62). The access code 36 enables access to the anonymous shadow copy 32 by matching the borrower information to the corresponding anonymous shadow copy 32. In other words, only someone knowing the access code 36 may access the corresponding anonymous shadow copy 32. Only someone knowing what access code 36 matches what corresponding anonymous shadow copy 32 will be able to match the borrower information to the corresponding anonymous shadow copy 32.

Figure 3:
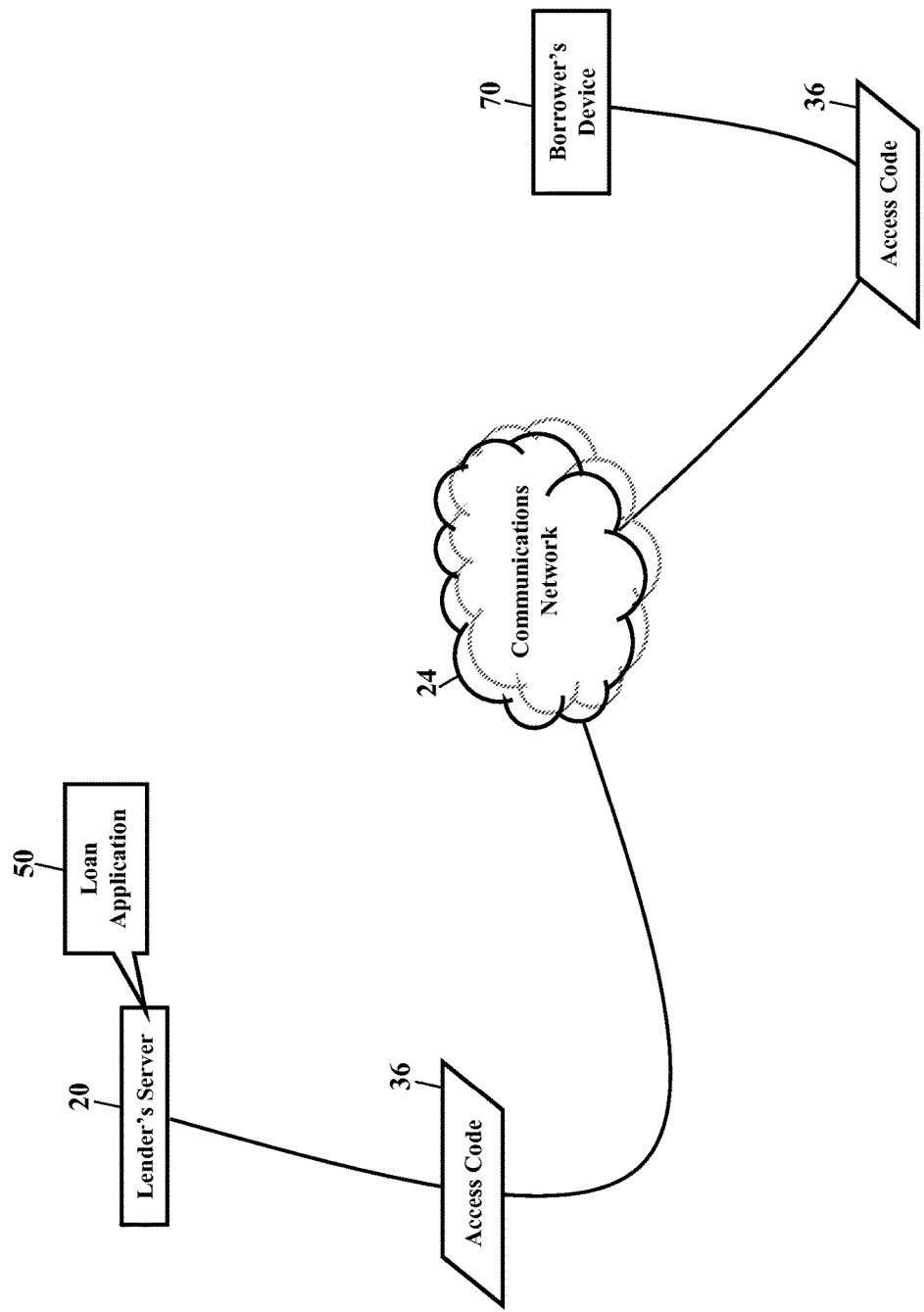
FIG. 3 is a schematic further illustrating the access code 36, according to exemplary embodiments.

FIG. 3 is a schematic further illustrating the access code 36, according to exemplary embodiments. After the access code 36 is generated, the access code 36 is communicated to the borrower. FIG. 3, for example, illustrates an electronic communication of the access code 36 to a borrower's device 70 associated with the borrower. The access code 36 may be communicated in an email, text message, data message, or any other electronic communication. The loan origination software 50, however, may also cause the access code 36 to be communicated by physical mail, voice message, telephone call, or any other means of communication.

Figure 4:
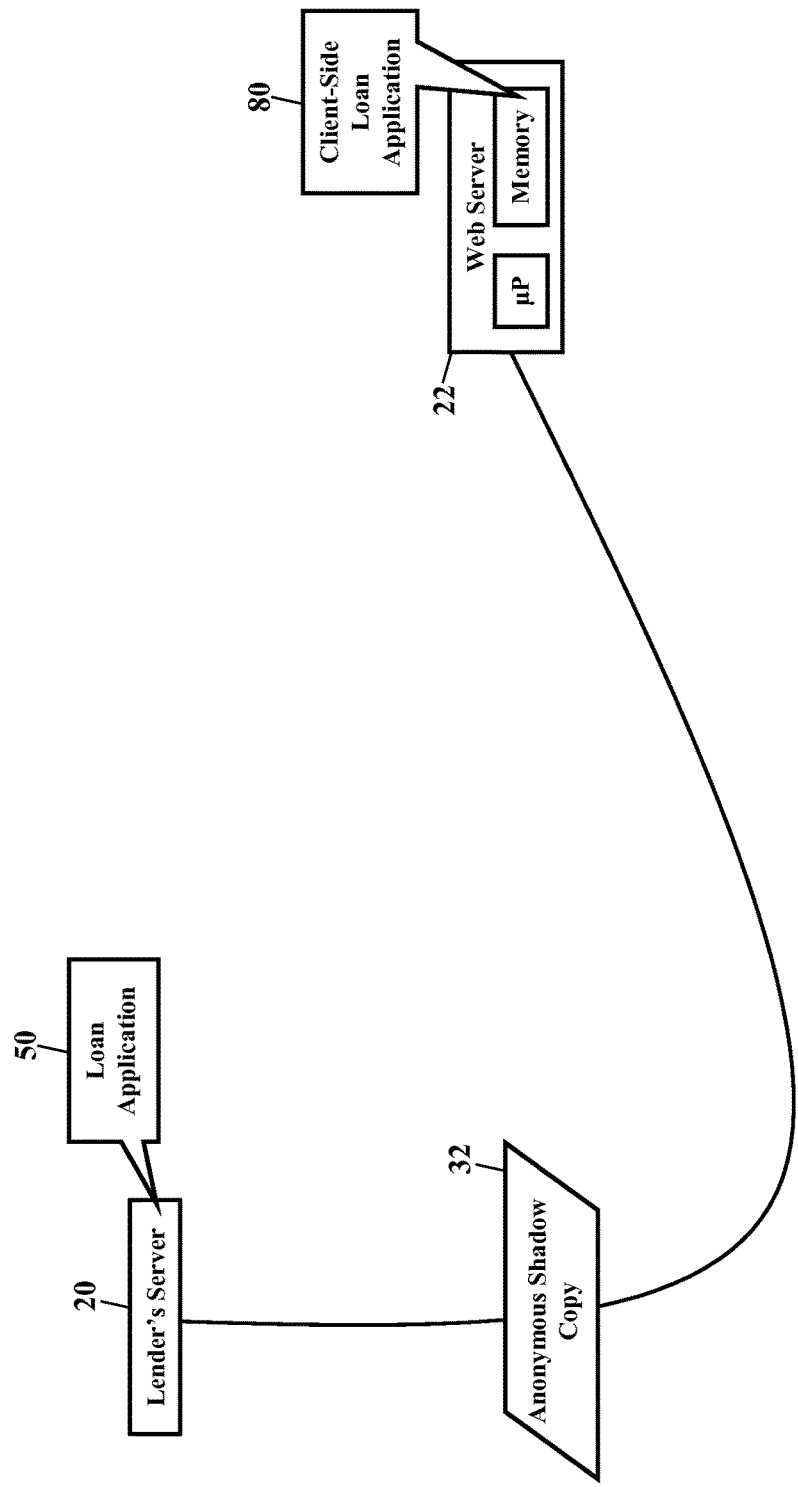
FIG. 4 is a schematic illustrating publication of the anonymous shadow copy 32, according to exemplary embodiments.

FIG. 4 is a schematic illustrating publication of the anonymous shadow copy 32, according to exemplary embodiments. Once the anonymous shadow copy 32 is generated, the lender's server 20 may send the anonymous shadow copy 32 to the web server 22. The web server 22 has a processor (e.g., "µP"), application specific integrated circuit (ASIC), or other component that executes a client-side loan application 80 stored in memory. The client-side loan application 80 cooperates with the loan origination software 50 to upload and store the anonymous shadow copy 32 to the memory of the web server 22.

Figure 5:
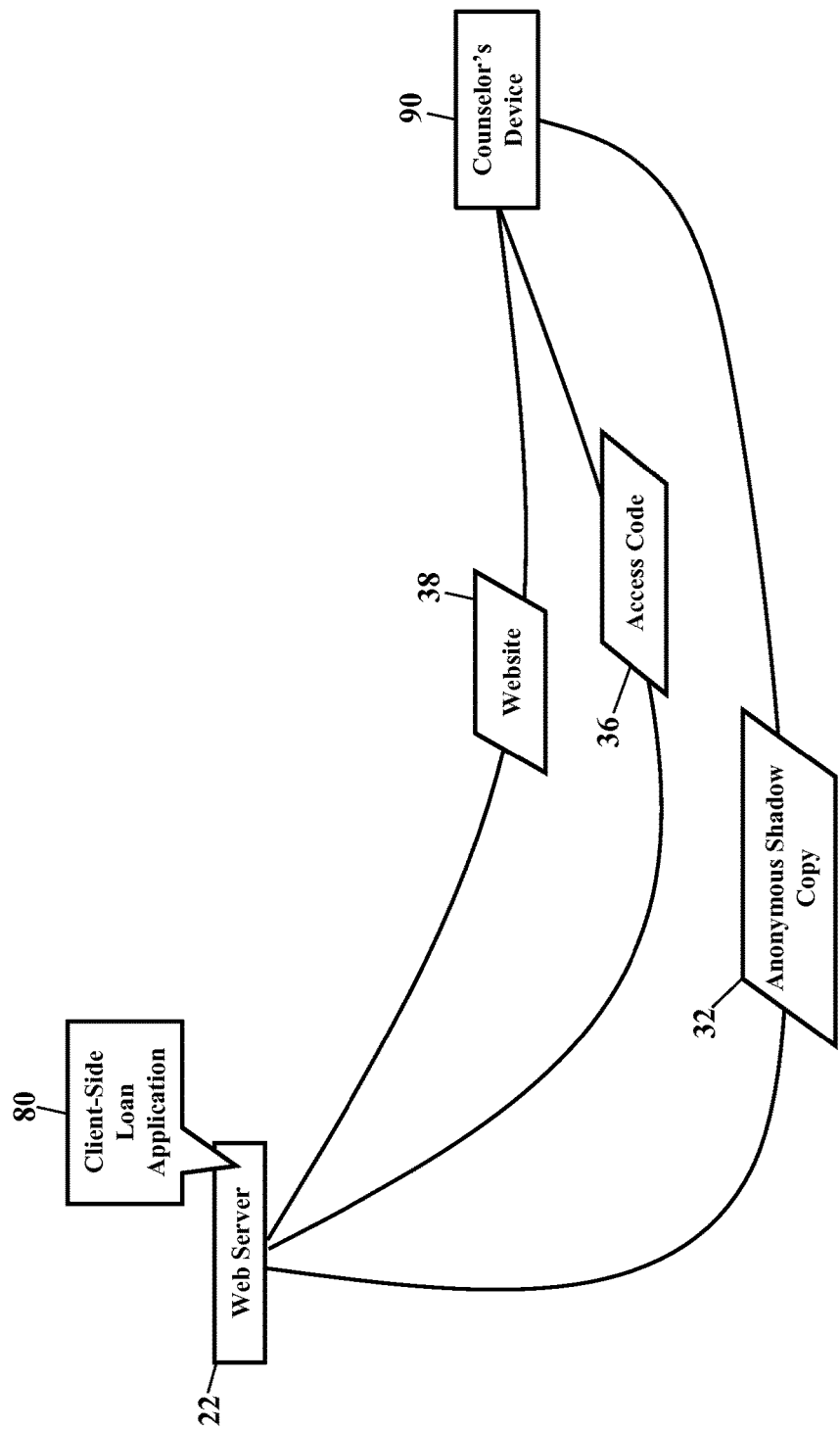
FIG. 5 is a schematic illustrating retrieval of the anonymous shadow copy 32, according to exemplary embodiments.

FIG. 5 is a schematic illustrating retrieval of the anonymous shadow copy 32, according to exemplary embodiments. At or prior to counseling, the borrower will communicate the access code 36 to the counselor. When the counselor has the borrower's access code 36, the counselor may then access the anonymous shadow copy 32 stored in the memory of the web server 22 and match the anonymous shadow copy 32 to the respective borrower. The counselor, for example, may download the website 38 to a counselor's device 90. The website 38 may provide access to the anonymous shadow copy 32. The counselor, at the counselor's device 90, may input the access code 36 into the website 38 and return the access code 36 to the web server 22. If the client-side loan origination software 80 verifies the access code 36, then the client-side loan origination software 80 may download the anonymous shadow copy 32 to the counselor's device 90. As an additional restriction, the borrower initials or another non-identifying information may be required to access the anonymous shadow copy 32. Moreover, access to the website 38 may, yet need not, be password-protected. Whoever accesses the website 38 and downloads the anonymous shadow copy 32 will only be able to match these documents to the borrower if they know the access code 36. Only somebody who can 1) match the access code 36 to a document and 2) match the access code 36 to the borrower will be able to match the anonymous shadow copy 32 to the borrower.

The counselor may then advise the borrower. While the borrower will have the originally-prepared electronic loan documents 30, the counselor may retrieve the anonymous shadow copy 32. The counselor may thus discuss contents of the electronic loan documents 30 without having access to the borrower's personally identifying information 34.

The access code 36 may also be purged. The loan origination software 50 may have a sub-module or routine that purges old access codes. The loan origination software 50 may periodically inspect all access codes and analyze whether the access code 36 should be expired based on a rule that is applied onto the date and time stamp 60 and a time offset. If the access code 36 is expired, then the entry in the database 62 may be deleted or marked deleted.

Figure 6:
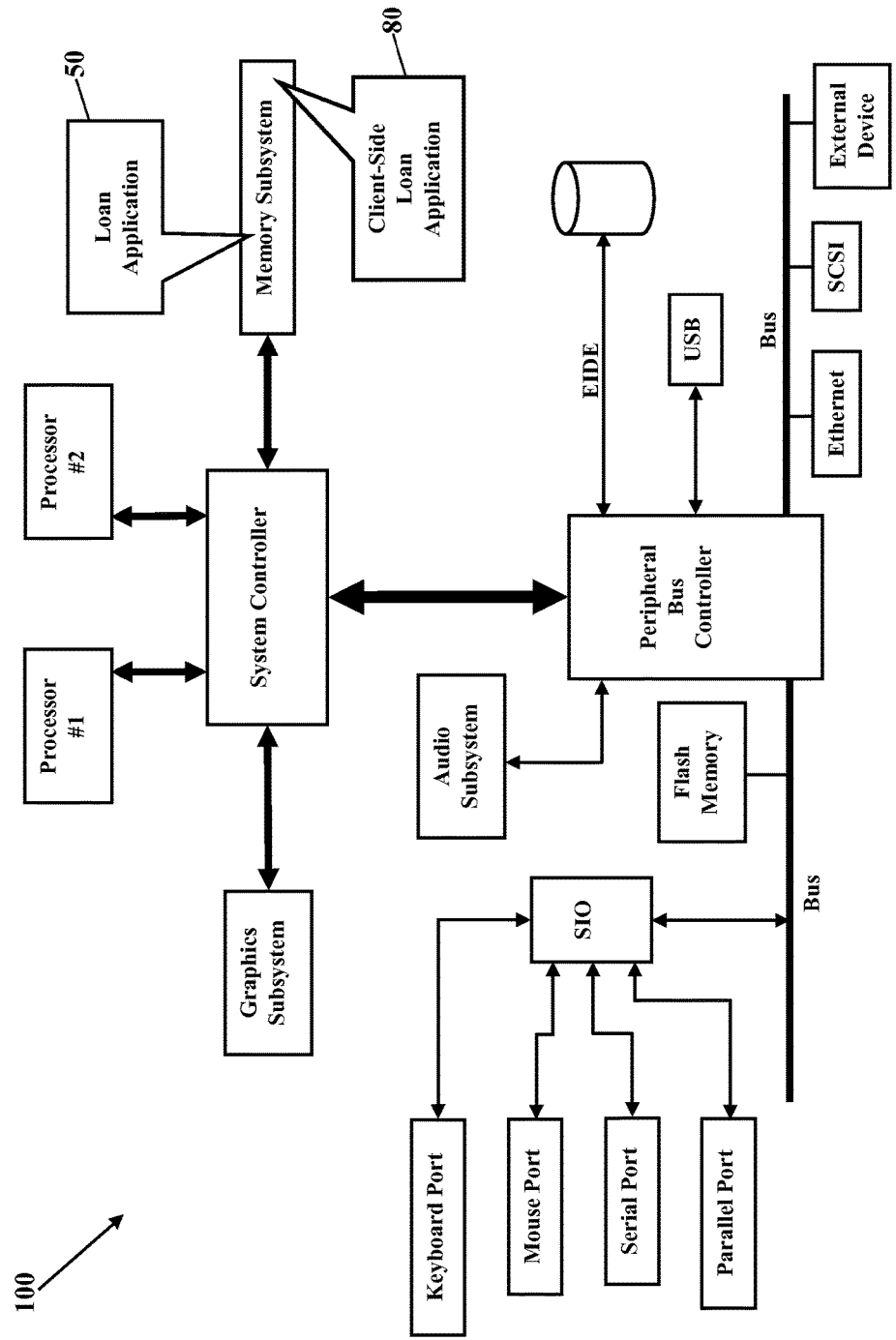
FIG. 6 is a block diagram illustrating a processor-controlled device, according to more exemplary embodiments.

FIG. 6 is a schematic illustrating still more exemplary embodiments. FIG. 6 is a generic block diagram illustrating the loan origination software 50 operating within a processor-controlled device 100. As an earlier paragraph explained, the loan origination software 50 may operate in any processor-controlled device 100. FIG. 6, then, illustrates the loan origination software 50 stored in a memory subsystem of the processor-controlled device 100. FIG. 6 also illustrates the client-side loan application 80 operating within the processor-controlled device 100. One or more processors communicate with the memory subsystem and execute the loan origination software 50 and/or the client-side loan application 80. Because the processor-controlled device 100 is well-known to those of ordinary skill in the art, no detailed explanation is needed.

Exemplary embodiments may be physically embodied on or in a transitory or non-transitory computer-readable storage medium. This computer-readable medium may include CD-ROM, DVD, tape, cassette, floppy disk, memory card, and large-capacity disks. This computer-readable medium, or media, could be distributed to end-subscribers, licensees, and assignees. A computer readable medium comprises processor-executable instructions for generating anonymous loan documents, as the above paragraphs explained.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

The invention claimed is:

1. A method, comprising:
   storing, by a server, electronic loan documents associated with a borrower of a loan;
   generating, by the server, an anonymous shadow copy of the electronic loan documents, the anonymous shadow copy having personally identifying information removed therefrom;
   storing, by the server, the anonymous shadow copy as a record in a database row of an electronic database;
   associating, by the server, the anonymous shadow copy to an access code;
   storing, by the server, the access code as another record in the database row of the electronic database;
   associating, by the server, the personally identifying information to the access code;
   storing, by the server, the personally identifying information in a different loan record of the electronic database;
   sending the access code to a device associated with the borrower of the loan;
   receiving a first request sent from a requesting device, the first request requesting the anonymous shadow copy of the electronic loan documents;
   retrieving the anonymous shadow copy from the database row of the electronic database;
   sending the anonymous shadow copy to the requesting device in response to the first request;
   receiving a second request sent from the requesting device, the second request requesting the personally identifying information and specifying the access code;
   querying the electronic database for the access code specified by the second request;
   retrieving the personally identifying information from the different loan record of the electronic database, the personally identifying information associated with the access code; and
   sending the personally identifying information to the requesting device in response to the second request;
   wherein the personally identifying information is separately stored from the database row containing the anonymous shadow copy.

2. The method of claim 1, further comprising receiving a request for the electronic loan documents.

3. The method of claim 1, further comprising removing the personally identifying information from the electronic loan documents.

4. The method of claim 1, further comprising electronically publishing the anonymous shadow copy of the electronic loan documents.

5. The method of claim 1, further comprising time stamping the anonymous shadow copy of the electronic loan documents.

6. The method of claim 1, further comprising time stamping the electronic loan documents.

7. The method of claim 1, further comprising clearing a data field containing the personally identifying information.

8. A system, comprising:
   a hardware processor; and
   a memory device, the memory device storing instructions, the instructions when executed causing the hardware processor to perform operations, the operations comprising:
   storing electronic loan documents associated with a borrower of a loan;
   generating an anonymous shadow copy of the electronic loan documents, the anonymous shadow copy having personally identifying information removed therefrom;
   storing the anonymous shadow copy as a record in a row of an electronic database;
   associating the anonymous shadow copy to an access code;
   storing the access code as another record in the row of the electronic database;
   storing a database association between the personally identifying information and the access code in a different loan record within in the electronic database;

sending the access code to a device associated with the borrower of the loan;

receiving a first request sent from a requesting device, the first request requesting the anonymous shadow copy of the electronic loan documents;

retrieving the anonymous shadow copy from the row of the electronic database;

sending the anonymous shadow copy to the requesting device in response to the first request;

receiving a second request sent from the requesting device, the second request requesting the personally identifying information and specifying the access code;

querying the electronic database for the access code specified by the second request;

retrieving the personally identifying information from the different loan record of the electronic database, the personally identifying information associated with the access code; and sending the personally identifying information to the requesting device in response to the second request;

wherein the personally identifying information is separately stored from the row of the electronic database containing the anonymous shadow copy.

9. The system of claim 8, wherein the operations further comprise receiving a request for the electronic loan documents.

10. The system of claim 8, wherein the operations further comprise removing the personally identifying information from the electronic loan documents.

11. The system of claim 8, wherein the operations further comprise electronically publishing the anonymous shadow copy of the electronic loan documents.

12. The system of claim 8, wherein the operations further comprise time stamping the anonymous shadow copy of the electronic loan documents.

13. The system of claim 8, wherein the operations further comprise time stamping the electronic loan documents.

14. The system of claim 8, wherein the operations further comprise clearing a data field containing the personally identifying information.

15. A memory device storing instructions that when executed cause a hardware processor to perform operations, the operations comprising:

storing electronic loan documents associated with a borrower of a loan;

generating an anonymous shadow copy of the electronic loan documents, the anonymous shadow copy having personally identifying information removed therefrom;

storing the anonymous shadow copy as a record in a row of an electronic database;

associating the anonymous shadow copy to an access code;

storing the access code in another record in the row of the electronic database;

associating the personally identifying information to the access code in a different loan record of the electronic database;

sending the access code to a device associated with the borrower of the loan;

receiving a first request sent from a requesting device, the first request requesting the anonymous shadow copy of the electronic loan documents;

retrieving the anonymous shadow copy from the row of the electronic database;

sending the anonymous shadow copy to the requesting device in response to the first request;

receiving a separate second request sent from the requesting device, the separate second request requesting the personally identifying information, and the separate second request specifying the access code;

querying the electronic database for the access code specified by the separate second request;

retrieving the personally identifying information from the different loan record of the electronic database, the personally identifying information associated with the access code; and sending the personally identifying information to the requesting device in response to the separate second request;

wherein the personally identifying information is separately stored from the anonymous shadow copy.

16. The memory device of claim 15, wherein the operations further comprise receiving a request for the electronic loan documents.

17. The memory device of claim 15, wherein the operations further comprise electronically publishing the anonymous shadow copy of the electronic loan documents.

18. The memory device of claim 15, wherein the operations further comprise time stamping the anonymous shadow copy of the electronic loan documents.

19. The memory device of claim 15, wherein the operations further comprise time stamping the electronic loan documents.

* * * * *